United States Patent
Dasgupta et al.

(10) Patent No.: US 11,265,753 B2
(45) Date of Patent: Mar. 1, 2022

(54) GUARANTEED BIT RATE ADJUSTABILITY

(71) Applicant: Cisco Technology, Inc., San Jose, CA (US)

(72) Inventors: Sandeep Dasgupta, Bangalore (IN); Somaraju Kaki, Bangalore (IN); Ravi Sankar Mantha, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 114 days.

(21) Appl. No.: 16/556,663

(22) Filed: Aug. 30, 2019

(65) Prior Publication Data

US 2021/0068002 A1    Mar. 4, 2021

(51) Int. Cl.
| | |
|---|---|
| *H04W 28/02* | (2009.01) |
| *H04W 28/22* | (2009.01) |
| *H04W 8/00* | (2009.01) |
| *H04L 47/263* | (2022.01) |
| *H04W 28/24* | (2009.01) |
| *H04W 72/10* | (2009.01) |

(52) U.S. Cl.
CPC ....... *H04W 28/0257* (2013.01); *H04L 47/263* (2013.01); *H04W 8/005* (2013.01); *H04W 28/0268* (2013.01); *H04W 28/22* (2013.01); *H04W 28/24* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 8,335,161 B2 | 12/2012 | Foottit et al. | |
| 9,231,774 B2 | 1/2016 | Cai et al. | |
| 9,413,666 B2 | 8/2016 | Vaidya et al. | |
| 9,867,077 B2 | 1/2018 | Ahmad et al. | |
| 10,893,434 B2 * | 1/2021 | Liu | H04L 65/1069 |
| 10,980,084 B2 * | 4/2021 | Dao | H04W 4/24 |
| 2014/0022900 A1 | 1/2014 | Salot et al. | |
| 2020/0267617 A1 * | 8/2020 | Larsen | H04L 69/322 |
| 2020/0382986 A1 * | 12/2020 | Cakulev | H04W 28/24 |

(Continued)

OTHER PUBLICATIONS

Cisco, "PCC-QoS-Profile Configuration Mode Commands", downloaded Jun. 3, 2019, 10 pages.

(Continued)

*Primary Examiner* — Jamaal Henson
(74) *Attorney, Agent, or Firm* — Edell, Shapiro & Finnan, LLC

(57) ABSTRACT

In one example, a base station entity, for a mobile wireless network, obtains an indication of a first potential Guaranteed Bit Rate (GBR), a first unique identifier associated with the first potential GBR, a first priority level associated with the first potential GBR, a second potential GBR, a second unique identifier associated with the second potential GBR, and a second priority level associated with the second potential GBR. Based on the first priority level being associated with a higher priority than the second priority level, the base station entity determines whether the first potential GBR can be supported. If so, the base station entity provides an indication of the first unique identifier to a core network associated with the mobile wireless network, wherein the indication of the first unique identifier prompts the core network to enforce the first potential GBR.

20 Claims, 7 Drawing Sheets

(56) References Cited

U.S. PATENT DOCUMENTS

| | | | | |
|---|---|---|---|---|
| 2020/0383005 A1* | 12/2020 | Wu | .................. | H04W 28/0268 |
| 2021/0021650 A1* | 1/2021 | Hori | .................. | H04L 65/1046 |
| 2021/0045016 A1* | 2/2021 | Dong | ............... | H04W 28/0263 |
| 2021/0075864 A1* | 3/2021 | Sun | .................... | H04L 67/2809 |

OTHER PUBLICATIONS

3GPP, "3rd Generation Partnership Project; Technical Specification Group Core Network and Terminals; Interface between the Control Plane and the User Plane Nodes; Stage 3 (Release 15)", 3GPP TS 29.244 V15.5.0, Mar. 2019, 198 pages.

3GPP, "3rd Generation Partnership Project; Technical Specification Group Core Network and Terminals; General Packet Radio System (GPRS) Tunnelling Protocol User Plane (GTPv1-U) (Release 15)", 3GPP TS 29.281 V15.5.0, Dec. 2018, 32 pages.

3GPP, "3rd Generation Partnership Project; Technical Specification Group Radio Access Network; NG-RAN; NG Application Protocol (NGAP) (Release 15)", 3GPP TS 38.413 V15.3.0, Mar. 2019, 319 pages.

3GPP, "3rd Generation Partnership Project; Technical Specification Group Services and System Aspects; Study on architecture enhancements for the Evolved Packet System (EPS) and the 5G System (5GS) to support advanced V2X services (Release 16)", 3GPP TR 23.786 V16.0.0, Mar. 2019, 118 pages.

3GPP, "3rd Generation Partnership Project; Technical Specification Group Core Network and Terminals; 5G System; Session Management Policy Control Service; Stage 3 (Release 16)", 3GPP TS 29.512 V16.0.0, Mar. 2019, 142 pages.

\* cited by examiner

300A

QoS1 {id=1, GBR = 12 Mbps, preference = 1}
QoS2 {id=2, GBR = 7.5 Mbps, preference = 2}
QoS3 {id=3, GBR = 4 Mbps, preference = 3}

QER1 mapped to QoS1
QER2 mapped to QoS2
QER3 mapped to QoS3

710 — FOR A MOBILE WIRELESS NETWORK, OBTAIN AN INDICATION OF A FIRST POTENTIAL GUARANTEED BIT RATE, A FIRST UNIQUE IDENTIFIER ASSOCIATED WITH THE FIRST POTENTIAL GUARANTEED BIT RATE, A FIRST PRIORITY LEVEL ASSOCIATED WITH THE FIRST POTENTIAL GUARANTEED BIT RATE, A SECOND POTENTIAL GUARANTEED BIT RATE, A SECOND UNIQUE IDENTIFIER ASSOCIATED WITH THE SECOND POTENTIAL GUARANTEED BIT RATE, AND A SECOND PRIORITY LEVEL ASSOCIATED WITH THE SECOND POTENTIAL GUARANTEED BIT RATE

720 — OBTAIN AN INDICATION OF THE FIRST UNIQUE IDENTIFIER

730 — IN RESPONSE TO OBTAINING THE INDICATION OF THE FIRST UNIQUE IDENTIFIER, ENFORCE THE FIRST POTENTIAL GUARANTEED BIT RATE

FIG.7

GUARANTEED BIT RATE ADJUSTABILITY

TECHNICAL FIELD

The present disclosure relates to telecommunications technology.

BACKGROUND 5G, the fifth generation of cellular network technology, can support a Guaranteed Bit Rate (GBR). A GBR is the minimum bit rate used by an application. Many applications require a given GBR to provide a desired Quality of Service (QoS). For example, video streaming servers may need a certain GBR to stream high-definition video.

BRIEF DESCRIPTION OF THE DRAWINGS

FIG. 3A illustrates a logical representation of information associated with respective potential GBRs, according to an example embodiment.

FIG. 3B illustrates a logical representation that shows respective levels of Quality of Service (QoS) and corresponding QoS Enforcement Rules (QERs), according to an example embodiment.

FIG. 7 illustrates a flowchart of a method for adjusting GBR performed by a user plane function entity, according to an example embodiment.

DESCRIPTION OF EXAMPLE EMBODIMENTS

Overview

In one example embodiment, a base station entity, for a mobile wireless network, obtains an indication of a first potential Guaranteed Bit Rate (GBR), a first unique identifier associated with the first potential GBR, a first priority level associated with the first potential GBR, a second potential GBR, a second unique identifier associated with the second potential GBR, and a second priority level associated with the second potential GBR. Based on the first priority level being associated with a higher priority than the second priority level, the base station entity determines whether the first potential GBR can be supported. If it is determined that the first potential GBR can be supported, the base station entity provides an indication of the first unique identifier to a core network associated with the mobile wireless network. The indication of the first unique identifier prompts the core network to enforce the first potential GBR.

In another example embodiment, a user plane function entity, for a mobile wireless network, obtains an indication of a first potential GBR, a first unique identifier associated with the first potential GBR, a first priority level associated with the first potential GBR, a second potential GBR, a second unique identifier associated with the second potential GBR, and a second priority level associated with the second potential GBR. The user plane function entity obtains an indication of the first unique identifier and, in response to obtaining the indication of the first unique identifier, enforces the first potential GBR.

Example Embodiments

Figure 1:
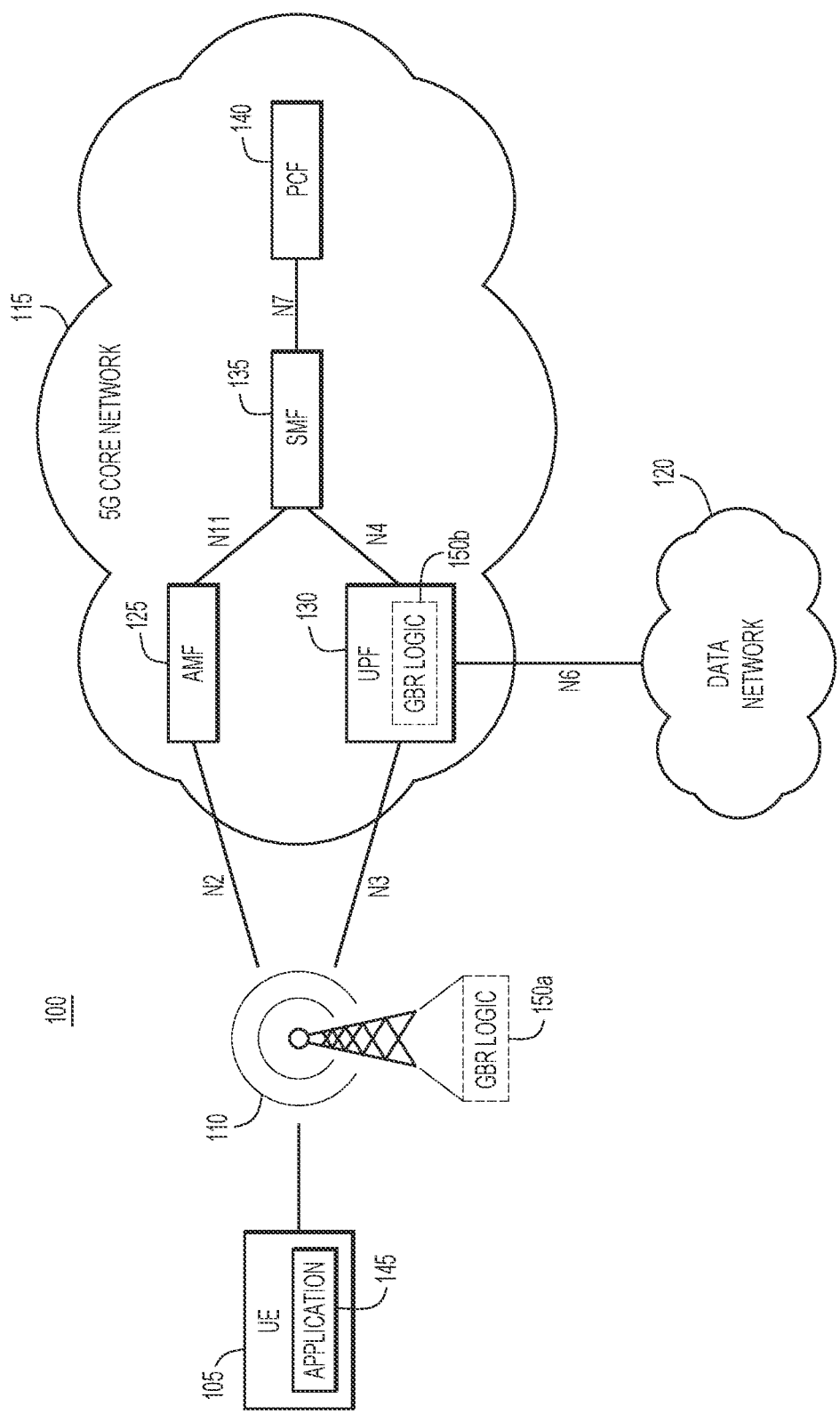
FIG. 1 illustrates a system configured to adjust Guaranteed Bit Rate (GBR), according to an example embodiment.

FIG. 1 illustrates system 100, which is configured to efficiently adjust Guaranteed Bit Rate (GBR). System 100 includes User Equipment (UE) 105, gNodeB 110, 5G core network 115, and data network 120 (e.g., the Internet). UE 105 may be a mobile phone, laptop, or other user device. gNodeB 110 may be a 5G base station entity configured to facilitate network traffic between UE 105 and 5G core network 115. 5G core network 115 may be associated with a broader mobile wireless network, and may be configured to facilitate the network traffic between UE 105 and data network 120.

5G core network 115 includes Access and Access Management Function (AMF) 125, User Plane Function (UPF) 130, Session Management Function (SMF) 135, and Policy Control Function (PCF) 140. AMF 125 may be configured to handle connection and mobility management tasks. UPF 130 may support packet routing, forwarding, and inspection. SMF 135 may be configured to perform session management establishment, modification, release, etc. PCF 140 may be configured to provide a unified policy framework for the network traffic.

gNodeB 110 and AMF 125 may be configured to communicate over an N2 interface. gNodeB 110 and UPF 130 may be configured to communicate over an N3 interface. UPF 130 and SMF 135 may be configured to communicate over an N4 interface. Data network 120 and UPF 130 may be configured to communicate over an N6 interface. SMF 135 and PCF 140 may be configured to communicate over an N7 interface. AMF 125 and SMF 135 may be configured to communicate over an N11 interface.

UE 105 may run application 145. In this example, application 145 is a video streaming application which requires a GBR of 12 Mbps for 1080p high definition video, 7.5 Mbps for 720p high definition video, and 4 Mbps for 480p video. Because resources in the Radio Access Network (RAN) (e.g., gNodeB 110) are limited and can often fluctuate unpredictably, the GBR of 12 Mbps may not always be available for application 145. As such, the GBR may need to change depending on the level of RAN congestion at a given time.

Conventionally, system 100 would create GBR flows to request the RAN to reserve a specific GBR. If gNodeB 110 could not guarantee a current GBR, gNodeB 110 would send, to SMF 135, an indication (e.g., a Protocol Data Unit (PDU) Session Resource Notify Transfer message) that gNodeB 110 cannot support the current GBR. SMF 135 would send a qncReport to PCF 140 passing on that information. PCF 140 would then send an updated policy with a new proposed GBR/downgraded QoS to gNodeB 110.

PCF 140 would not be aware of the amount by which the QoS should be downgraded, or whether the RAN is even able to guarantee the downgraded QoS. As such, gNodeB 110 might reject the proposed GBR if, for example, the proposed GBR is not compatible with application 145 or if the RAN resources at gNodeB 110 cannot support the proposed GBR. If gNodeB 110 rejects the proposed GBR, gNodeB 110 would indicate as such and PCF 140 would send another proposed GBR. This process would repeat until gNodeB 110 and 5G core network 115 negotiate a suitable GBR (or until it is determined that no suitable GBR can be negotiated). Furthermore, because RAN congestion can be a temporary condition, gNodeB 110 would initiate this process every time the RAN becomes sufficiently congested/de-congested. Thus, conventional techniques would create significant signaling traffic in the RAN as well as in 5G core network 115 in order to downgrade (or upgrade) the GBR, and would also introduce high latency for the QoS switch.

Accordingly, GBR logic 150a may be provided in gNodeB 110 and/or GBR logic 150b may be provided in UPF 130. GBR logic 150a and/or GBR logic 150b may cause gNodeB 110 and/or UPF 130 to perform QoS changes in the data path with reduced signaling in the RAN while increasing QoS downgrade/upgrade speed. Multiple QoS options may be provisioned upfront to provide near-instantaneous adaptation to the switched QoS and eliminate much of the signaling traffic associated with conventional approaches. This may enable quick and dynamic adaptation to RAN congestion conditions and provide flexibility to downgrade/upgrade GBRs for a flow in a seamless manner with minimum latency for an improved user experience while simultaneously reducing core network signaling. While GBR logic 150a and 150b are respectively located at gNodeB 110 and UPF 130 in this example, it will be appreciated that further GBR logic may be located in any suitable entity/entities in other examples (e.g., SMF 135).

gNodeB 110 may obtain an indication of a first potential GBR (e.g., 12 Mbps), a first unique identifier associated with the first potential GBR (e.g., a first unique eight-bit identifier), and a first priority level associated with the first potential GBR (e.g., "1"). The indication may further include a second potential GBR (e.g., 7.5 Mbps), a second unique identifier associated with the second potential GBR (e.g., a second unique eight-bit identifier), and a second priority level associated with the second potential GBR (e.g., "2"). The indication may be a Policy Charging and Control (PCC) rule obtained from PCF 140 via SMF 135 and AMF 125. UPF 130 may also obtain an indication of the first and second potential GBRs, first and second unique identifiers, and the first and second priority levels from PCF 140.

The first priority level ("1") is associated with a higher priority than the second priority level ("2"). This indicates that the first potential GBR (12 Mbps) is preferable to the second potential GBR (7.5 Mbps). As such, gNodeB 110 may determine whether the first potential GBR (12 Mbps) can be supported (rather than determining whether the second potential GBR of 7.5 Mbps is supported). If gNodeB 110 determines that the first potential GBR (12 Mbps) can be supported, gNodeB 110 may provide an indication of the first unique identifier to 5G core network 115. The indication of the first unique identifier may prompt 5G core network 115 to enforce the first potential GBR (12 Mbps). For example, UPF 130 may obtain the indication of the first unique identifier from gNodeB 110 and, in response, enforce the first potential GBR (12 Mbps). If gNodeB 110 determines that the first potential GBR (12 Mbps) cannot be supported, gNodeB 110 may instead determine whether the second potential GBR (7.5 Mbps) can be supported and, if so, provide an indication of the second unique identifier to 5G core network 115.

In this example, gNodeB 110 determines that the first potential GBR (12 Mbps) can be supported. Sometime after providing the indication of the first unique identifier, gNodeB 110 may determine that the first potential GBR can no longer be supported. In response, gNodeB 110 may provide an indication of the second unique identifier to 5G core network 115. The indication of the second unique identifier may prompt 5G core network 115 to enforce the second potential GBR (7.5 Mbps). Optionally, the indication of the second unique identifier may further prompt generation of a usage report (e.g., by UPF 130) indicating that 5G core network 115 is enforcing the second potential GBR. The usage report may enable differential charging based on the QoS/GBR provided.

In one example, gNodeB 110 may provide the indication of the first unique identifier (and/or the indication of the second unique identifier) in a network packet header of a data packet. For instance, gNodeB 110 may send the indication of the first unique identifier in the N3 header of an Uplink (UL) data packet to UPF 130. This may minimize latency associated with the GBR change as the data path switches to the new GBR almost immediately without any additional signaling, thereby improving user experience. Signaling in 5G core network 115 is also reduced as no additional signaling traffic is required between gNodeB 110 and SMF 135, or between SMF 135 and PCF 140.

Based on the first unique identifier received in the N3 header, UPF 130 may dynamically switch to the appropriate GBR. The compute resources required on UPF 130 may be reduced as the GBRs/QoSs are provisioned upfront and it is not necessary to create or modify a new rule for every GBR change. Furthermore, UPF 130 may asynchronously report the usage upon every GBR change to allow SMF 135 to report the usage back to a Charging Function (CHF) and optionally notify PCF 140 about the GBR change. Where no differential charging is needed for different potential GBRs, and notification to PCF 140 is also not needed, this signaling from UPF 130 to SMF 135 may also be avoided.

It will be appreciated that any number of potential GBRs may be supported with the techniques described herein. For example, the indication obtained by gNodeB 110 may also include a third potential GBR (e.g., 4 Mbps), a third unique identifier associated with the third potential GBR (e.g., a third unique eight-bit identifier), and a third priority level associated with the third potential GBR (e.g., "3"). In certain examples, gNodeB 110 may provide an indication of the third unique identifier to 5G core network 115 to prompt 5G core network 115 to enforce the third potential GBR (4 Mbps). Furthermore, although in the present example application 145 is a video streaming application, in general application 145 may be any suitable application, such as an enhanced Vehicle-to-Everything (eV2X) application.

Figure 2:
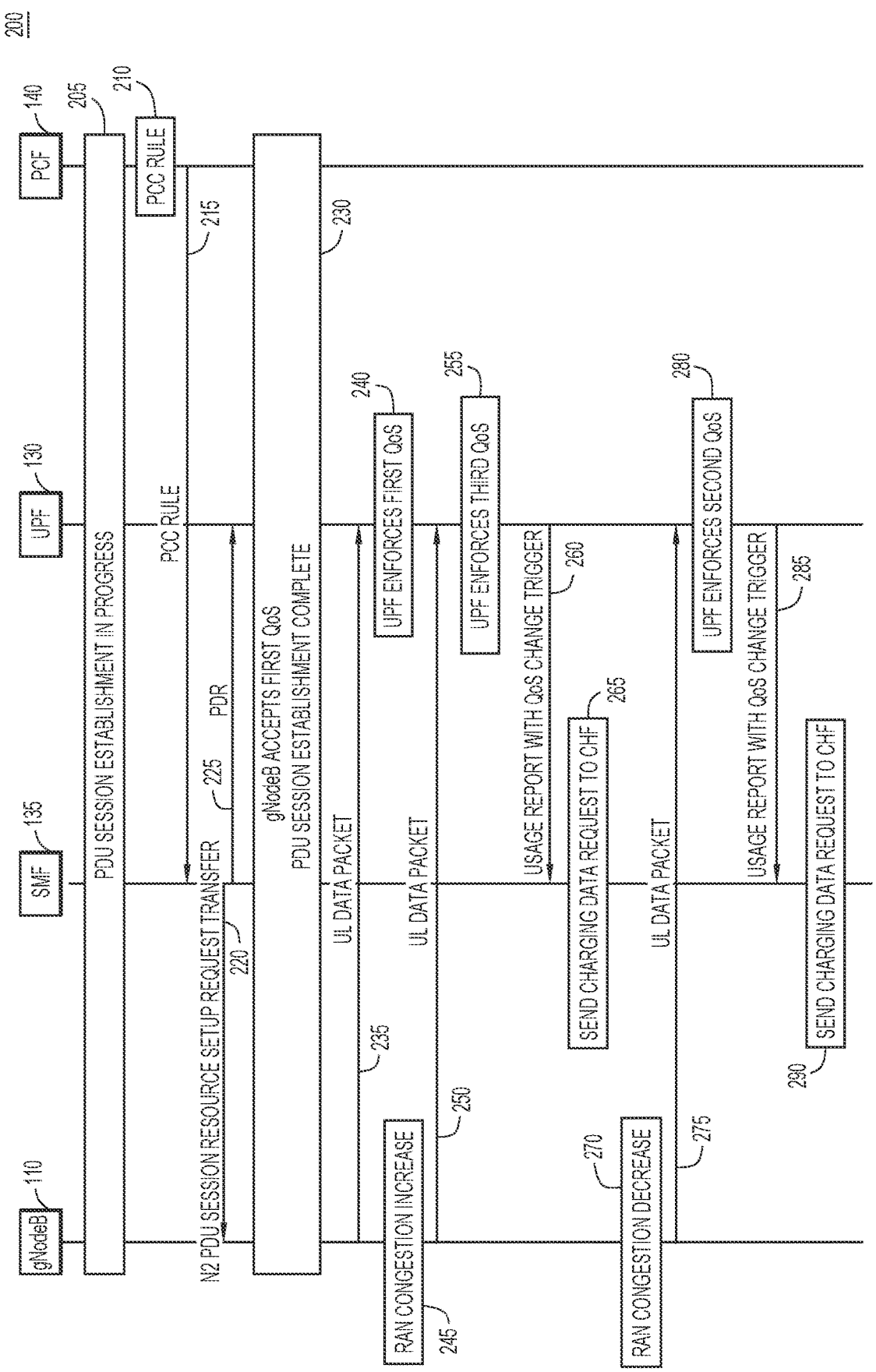
FIG. 2 illustrates a sequence diagram that shows operations performed by various entities in the system of FIG. 1, according to an example embodiment.

Turning now to FIG. 2, and with continued reference to FIG. 1, shown is sequence diagram 200. Sequence diagram 200 illustrates example operations performed by gNodeB 110, UPF 130, SMF 135, and PCF 140. At 205, gNodeB 110, UPF 130, SMF 135, and PCF 140 are establishing a PDU session. At 210, PCF 140 generates a PCC rule (e.g., packet filters for video server). The PCC rule includes three QoS descriptors. The first descriptor is associated with the GBR of 12 Mbps, the second descriptor is associated with the GBR of 7.5 Mbps, and the third descriptor is associated with the GBR of 4 Mbps. Each descriptor also has a unique identifier and preference/priority level. The first descriptor has a first unique identifier and a highest priority. The second descriptor has a second unique identifier and a middle (medium) priority. The third descriptor has a third unique identifier and a lowest priority.

At 215, PCF 140 sends, to SMF 135 via the N7 interface, an SmPolicyDecision message with the PCC rule associated with the three QoS descriptors. The RefQoS field of the PCC rule may have multiple QoS data references to allow for this. The QoS Data Information Element (IE) in the PCC rule may include two integer-type fields: a preference field and a unique identifier field. The preference field may indicate the preference of the QoS data relative to the other QoS data associated with the PCC rule. The unique identifier field may include the unique identifiers.

At 220, gNodeB 110 receives, from SMF 135 (via AMF 125), an N2 PDU Session Resource Setup Request Transfer IE including the QoS flow information (e.g., the three QoS alternatives and respective unique identifiers and preferences/priority levels). In one example, the PDU Session Resource Setup Request Transfer IE may include a GBR QoS Flow Information IE that provides information regarding the possible GBR values and associated preferences and unique identifiers received from PCF 140. gNodeB 110 may use this information to associate each QoS for a flow with a unique identifier.

At 225, SMF 135 sends a Packet Detection Rule (PDR) associated with three QoS Enforcement Rules (QERs) to UPF 130 via the N4 interface. The three QERs respectively correspond to the three GBR alternatives and may include the unique identifiers. The Create QoS Enforcement Rule (Create QER) IE on the N4 interface may hold multiple UL and Downlink (DL) GBR values with associated preference values received from PCF 140. SMF 135 may also provision a QoS change charging trigger in an associated Usage Reporting Rule (URR).

At 230, gNodeB 110 saves all three QoS alternatives and applies the QoS with the highest preference for which gNodeB 110 can handle the corresponding GBR at a given time. In this example, gNodeB 110 selects the first QoS (GBR of 12 Mbps) and the PDU session establishment across gNodeB 110, UPF 130, SMF 135, and PCF 140 is complete. At 235, gNodeB 110 sends a UL data packet to UPF 130 via the N3 interface. The UL data packet may include the unique identifier corresponding to the GBR of 12 Mbps in the N3 header. In one specific example, the UL PDU Session IE of the PDU Session Container extension header on the N3 interface may include an eight-bit field to accommodate the unique identifier. gNodeB 110 may fill the N3 header with the unique identifier corresponding to the selected QoS (here, the GBR of 12 Mbps) to indicate that QoS to UPF 130. At 240, upon receiving the UL data packet, UPF 130 matches the received unique identifier and begins enforcing the first QoS corresponding to 12 Mbps for the PDR.

Sometime later, at 245, gNodeB 110 determines that gNodeB 110 can now only provide up to 5 Mbps due to RAN congestion which limits the available radio resources. As such, gNodeB 110 can honor only the third preference (4 Mbps). At 250, gNodeB 110 sends, to UPF 130, a UL data packet that includes the unique identifier corresponding to the GBR of 4 Mbps. Unlike conventional approaches, no additional signaling to SMF 135 is required here.

At 255, upon receiving the UL data packet, UPF 130 matches the received unique identifier and switches to the third QER for DL QoS enforcement (4 Mbps). At 260, UPF 130 also triggers a usage report to SMF 135 with the QoS change trigger via the N4 interface. The Reporting Trigger IE utilized in usage reporting by UPF 130 to SMF 135 may include the QoS switch as a trigger type to report the usage when UPF 130 detects a change in the unique identifier from gNodeB 110 via the N3 interface. Usage reporting is optional and may be implemented when the operator desires differential billing for each QoS switch. At 265, SMF 135 may report the usage and the updated unique identifier to the CHF so that differential billing is performed for the downgraded QoS.

Sometime later, at 270, the RAN congestion reduces and gNodeB 110 determines that gNodeB 110 can now provide up to 8 Mbps. Accordingly, at 275 gNodeB 110 switches to the second preferred QoS (corresponding to the GBR of 7.5 Mbps) and sends the second unique identifier in the N3 header of a UL data packet to UPF 130. At 280, UPF 130 detects the QoS change and switches to the second QER corresponding to 7.5 Mbps for DL enforcement. At 285, UPF 130 triggers a usage report to SMF 135 with the QoS change trigger. At 290, SMF 135 may report the usage and the updated unique identifier to the CHF so that differential billing may be performed for the upgraded QoS.

FIG. 3A illustrates a logical representation 300A of information associated with respective potential GBRs. Three QoSs are shown. QoS1 corresponds to the GBR of 12 Mbps, the first unique identifier, and the highest preference. QoS2 corresponds to the GBR of 7.5 Mbps, the second unique identifier, and the middle (medium) preference. QoS3 corresponds to the GBR of 4 Mbps, the third unique identifier, and the lowest preference.

FIG. 3B illustrates a logical representation 300B that shows respective levels of QoS and corresponding QERs. Three QERs are shown: QER1 is mapped to QoS1, QER2 is mapped to QoS2, and QER3 is mapped to QoS3. UPF 130, for example, may use the QERs to enforce the appropriate QoS based on one or more UL data packets received from gNodeB 110.

Figure 4:
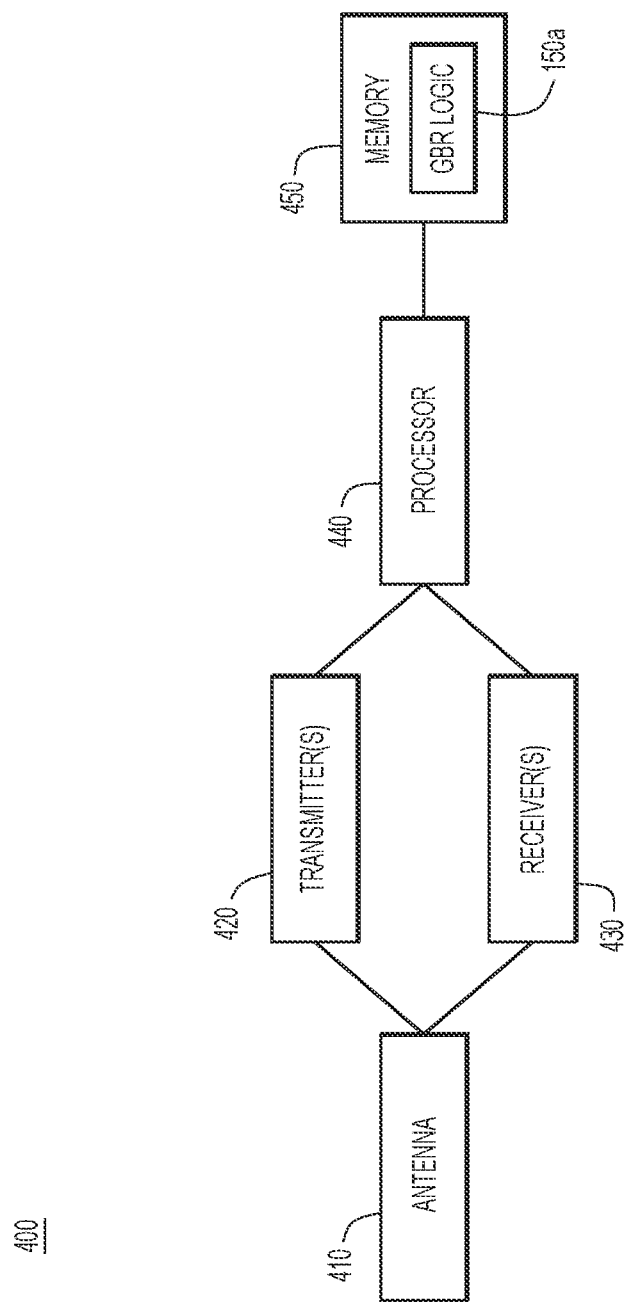
FIG. 4 illustrates a block diagram of a device configured to adjust GBR, according to an example embodiment.

FIG. 4 illustrates a hardware block diagram of device 400 (e.g., a base station entity such as gNodeB 110). Device 400 includes antenna 410, one or more transmitters 420, and one or more receivers 430, processor 440, and memory 450. Antenna 410, one or more transmitters 420, and one or more receivers 430 may collectively serve as a network interface configured to provide and/or obtain network communications to/from other data processing systems or devices. Instructions for GBR logic 150a may be stored in memory 450 for execution by processor 440. It should be appreciated that FIG. 4 provides only an illustration of one embodiment and does not imply any limitations with regard to the environments in which different embodiments may be implemented. Many modifications to the depicted environment may be made.

Memory 450 may be any suitable volatile or non-volatile computer readable storage media. Memory 450 may include Random Access Memory (RAM), cache memory, persistent storage, magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information. The media used by memory 450 may be removable (e.g., hard drive, optical or magnetic disk, thumb drive, smart card, etc.).

Figure 5:
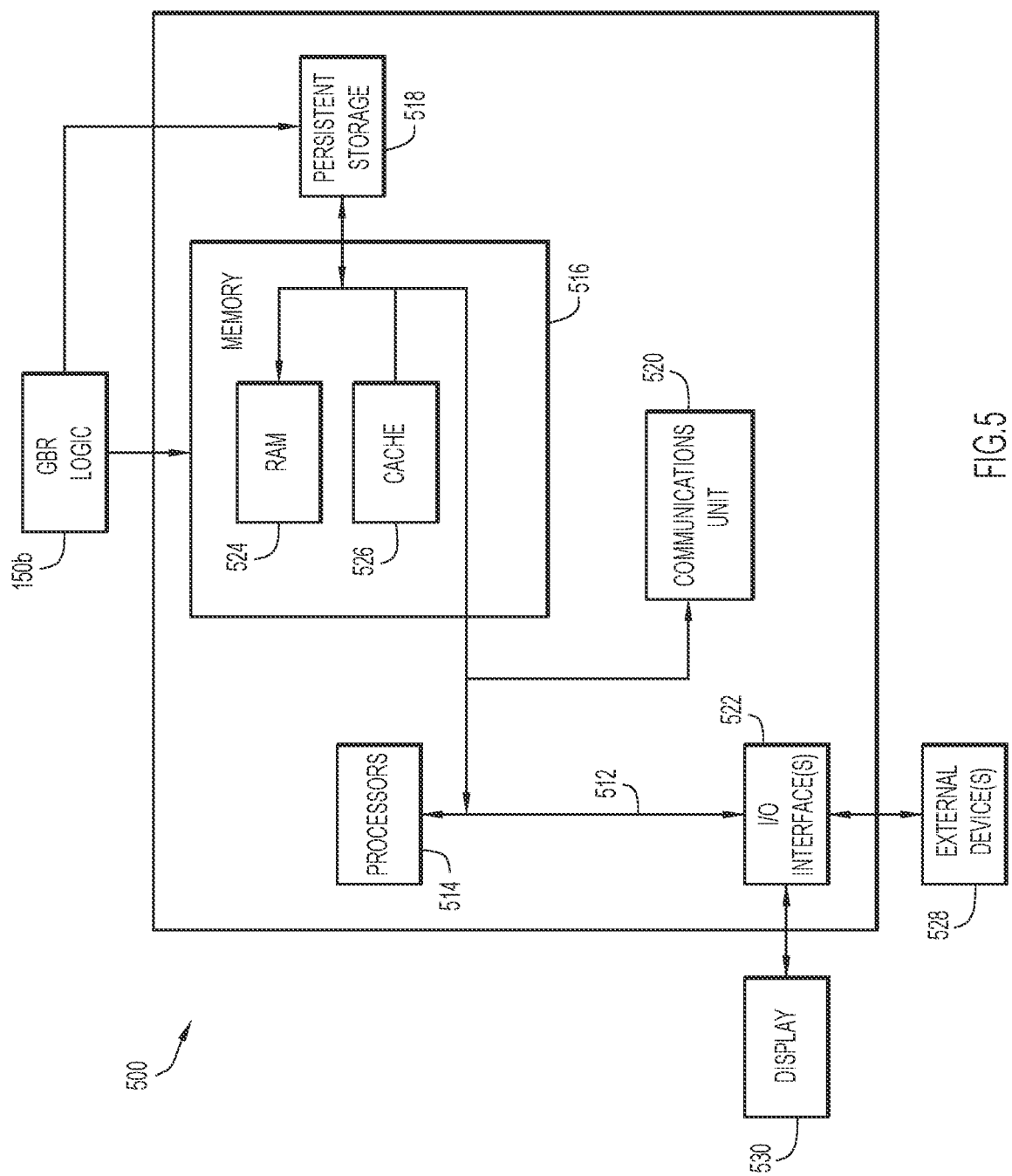
FIG. 5 illustrates a block diagram of another device configured to adjust GBR, according to an example embodiment

FIG. 5 illustrates a hardware block diagram of device 500 (e.g., a user plane function such as UPF 130). It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and Input/Output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes Random Access Memory (RAM) 524 and cache memory 526. In general, memory 516 can include any suitable volatile or non-volatile computer readable storage media. Instructions for GBR logic 150*b* may be stored in memory 516 or persistent storage 518 for execution by computer processor(s) 514.

One or more programs may be stored in persistent storage 518 for execution by one or more of the respective computer processors 514 via one or more memories of memory 516. The persistent storage 518 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to device 500. For example, I/O interface(s) 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Figure 6:
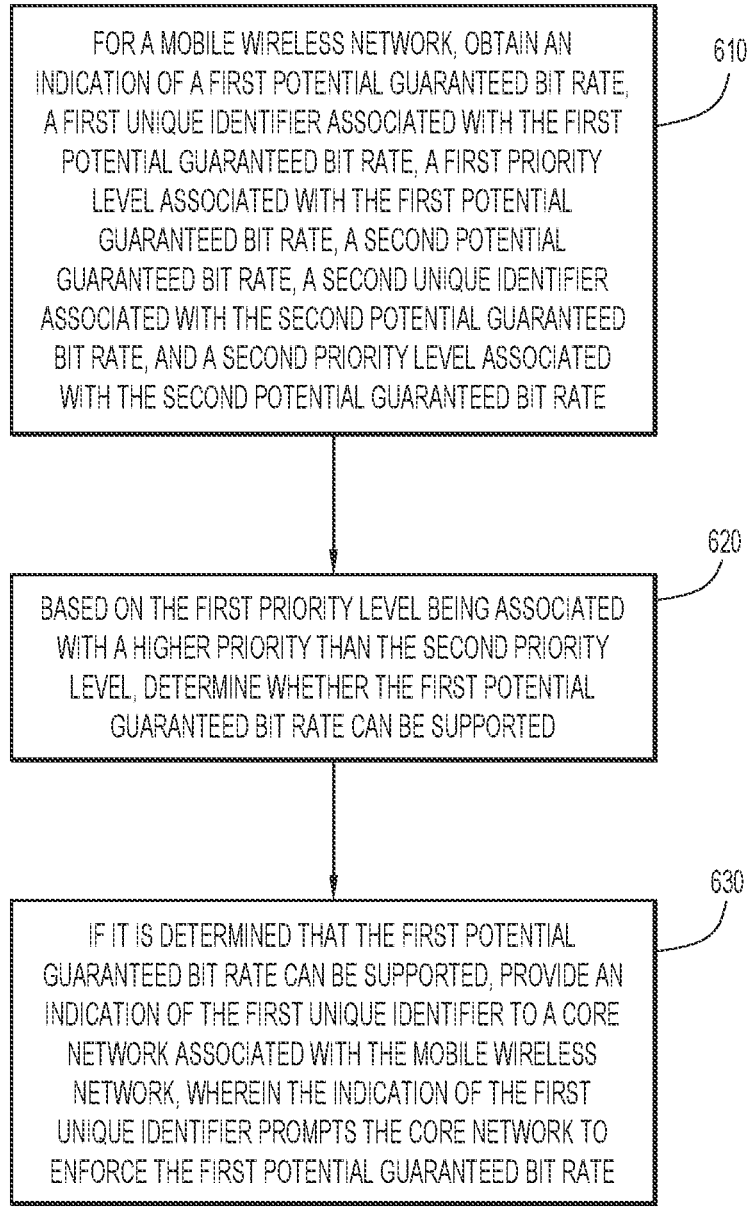
FIG. 6 illustrates a flowchart of a method for adjusting GBR performed by a base station entity, according to an example embodiment.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor FIG. 6 is a flowchart of method 600 for adjusting GBR performed by a base station entity (e.g., gNodeB 110). At 610, the base station entity, for a mobile wireless network, obtains an indication of a first potential GBR, a first unique identifier associated with the first potential GBR, a first priority level associated with the first potential GBR, a second potential GBR, a second unique identifier associated with the second potential GBR, and a second priority level associated with the second potential GBR.

At 620, based on the first priority level being associated with a higher priority than the second priority level, the base station entity determines whether the first potential guaranteed bit rate can be supported. At 630, if it is determined that the first potential guaranteed bit rate can be supported, the base station entity provides an indication of the first unique identifier to a core network associated with the mobile wireless network. The indication of the first unique identifier prompts the core network to enforce the first potential guaranteed bit rate.

FIG. 7 is a flowchart of method 700 for adjusting GBR performed by a user plane function entity (e.g., UPF 130). At 710, the user plane function entity, for a mobile wireless network, obtains an indication of a first potential GBR, a first unique identifier associated with the first potential GBR, a first priority level associated with the first potential GBR, a second potential GBR, a second unique identifier associated with the second potential GBR, and a second priority level associated with the second potential GBR. At 720, the user plane function entity obtains an indication of the first unique identifier. At 730, in response to obtaining the indication of the first unique identifier, the user plane function entity enforces the first potential GBR.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: for a mobile wireless network, obtaining an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate; based on the first priority level being associated with a higher priority than the second priority level, determining whether the first potential guaranteed bit rate can be supported; and if it is determined that the first potential guaranteed bit rate can be supported, providing an indication of the first unique identifier to a core network associated with the mobile wireless network, wherein the indication of the first unique identifier prompts the core network to enforce the first potential guaranteed bit rate.

In one example, the method further comprises: if it is determined that the first potential guaranteed bit rate can be supported: after providing the indication of the first unique identifier, determining that the first potential guaranteed bit rate cannot be supported; and in response to determining that the first potential guaranteed bit rate cannot be supported, providing an indication of the second unique identifier to the core network, wherein the indication of the second unique identifier prompts the core network to enforce the second potential guaranteed bit rate. In a further example, the indication of the second unique identifier further prompts generation of a usage report indicating that the core network is enforcing the second potential guaranteed bit rate.

In one example, providing the indication of the first unique identifier includes providing the indication of the first unique identifier in a network packet header of a data packet provided to the core network.

In one example, obtaining the indication of the first potential guaranteed bit rate, the first unique identifier, the first priority level, the second potential guaranteed bit rate, the second unique identifier, and the second priority level includes obtaining a policy and charging control rule that indicates the first potential guaranteed bit rate, the first unique identifier, the first priority level, the second potential guaranteed bit rate, the second unique identifier, and the second priority level.

In one example, the first unique identifier is a first unique eight-bit identifier and the second unique identifier is a second unique eight-bit identifier.

In one example, the method is performed by a fifth generation base station entity, and providing the indication of the first unique identifier to the core network includes providing the indication of the first unique identifier to a fifth generation core network.

In another form, an apparatus is provided. The apparatus comprises: a network interface configured to provide or obtain network communications; and one or more processors coupled to the network interface, wherein the one or more processors are configured to: for a mobile wireless network, obtain an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate; based on the first priority level being associated with a higher priority than the second priority level, determine whether the first potential guaranteed bit rate can be supported; and if it is determined that the first potential guaranteed bit rate can be supported, provide an indication of the first unique identifier to a core network associated with the mobile wireless network, wherein the indication of the first unique identifier prompts the core network to enforce the first potential guaranteed bit rate.

In another form, one or more non-transitory computer readable storage media are provided. The one or more non-transitory computer readable storage media are encoded with instructions that, when executed by a processor, cause the processor to: for a mobile wireless network, obtain an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate; based on the first priority level being associated with a higher priority than the second priority level, determine whether the first potential guaranteed bit rate can be supported; and if it is determined that the first potential guaranteed bit rate can be supported, provide an indication of the first unique identifier to a core network associated with the mobile wireless network, wherein the indication of the first unique identifier prompts the core network to enforce the first potential guaranteed bit rate.

In another form, a method is provided. The method comprises: for a mobile wireless network, obtaining an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate; obtaining an indication of the first unique identifier; and in response to obtaining the indication of the first unique identifier, enforcing the first potential guaranteed bit rate.

In one example, the method further comprises: after enforcing the first potential guaranteed bit rate, obtaining an indication of the second unique identifier; and in response to obtaining the indication of the second unique identifier, enforcing the second potential guaranteed bit rate. In a further example, the method further comprises: in response to obtaining the indication of the second unique identifier, generating a usage report indicating that the second potential guaranteed bit rate is being enforced.

In one example, obtaining the indication of the first unique identifier includes obtaining the indication of the first unique identifier in a network packet header of a data packet.

In one example, obtaining the indication of the first potential guaranteed bit rate, the first unique identifier, the first priority level, the second potential guaranteed bit rate, the second unique identifier, and the second priority level includes obtaining a packet detection rule that indicates the first potential guaranteed bit rate, the first unique identifier, the first priority level, the second potential guaranteed bit rate, the second unique identifier, and the second priority level.

In one example, the first unique identifier is a first unique eight-bit identifier and the second unique identifier is a second unique eight-bit identifier.

In one example, the method is performed by a fifth generation user plane function entity.

In another form, an apparatus is provided. The apparatus comprises: a network interface configured to provide or obtain network communications; and one or more processors coupled to the network interface, wherein the one or more processors are configured to: for a mobile wireless network, obtain an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate; obtain an indication of the first unique identifier; and in response to obtaining the indication of the first unique identifier, enforce the first potential guaranteed bit rate.

In another form, one or more non-transitory computer readable storage media are provided. The one or more non-transitory computer readable storage media are encoded with instructions that, when executed by a processor, cause the processor to: for a mobile wireless network, obtain an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate; obtain an indication of the first unique identifier; and in response to obtaining the indication of the first unique identifier, enforce the first potential guaranteed bit rate.

The above description is intended by way of example only. Although the techniques are illustrated and described herein as embodied in one or more specific examples, it is nevertheless not intended to be limited to the details shown, since various modifications and structural changes may be made within the scope and range of equivalents of the claim.

The invention claimed is:

1. A method comprising:
for a mobile wireless network, obtaining an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate;
based on the first priority level being associated with a higher priority than the second priority level, determining whether the first potential guaranteed bit rate can be supported; and
if it is determined that the first potential guaranteed bit rate can be supported, providing an indication of the first unique identifier to a core network associated with the mobile wireless network, wherein the indication of the first unique identifier prompts the core network to enforce the first potential guaranteed bit rate.

2. The method of claim 1, further comprising:
if it is determined that the first potential guaranteed bit rate can be supported:
after providing the indication of the first unique identifier, determining that the first potential guaranteed bit rate cannot be supported; and
in response to determining that the first potential guaranteed bit rate cannot be supported, providing an indication of the second unique identifier to the core network, wherein the indication of the second unique identifier prompts the core network to enforce the second potential guaranteed bit rate.

3. The method of claim 2, wherein the indication of the second unique identifier further prompts generation of a usage report indicating that the core network is enforcing the second potential guaranteed bit rate.

4. The method of claim 1, wherein providing the indication of the first unique identifier includes providing the indication of the first unique identifier in a network packet header of a data packet provided to the core network.

5. The method of claim 1, wherein obtaining the indication of the first potential guaranteed bit rate, the first unique identifier, the first priority level, the second potential guaranteed bit rate, the second unique identifier, and the second priority level includes obtaining a policy and charging control rule that indicates the first potential guaranteed bit rate, the first unique identifier, the first priority level, the second potential guaranteed bit rate, the second unique identifier, and the second priority level.

6. The method of claim 1, wherein the first unique identifier is a first unique eight-bit identifier and the second unique identifier is a second unique eight-bit identifier.

7. The method of claim 1, wherein the method is performed by a fifth generation base station entity, and wherein providing the indication of the first unique identifier to the core network includes providing the indication of the first unique identifier to a fifth generation core network.

8. An apparatus comprising:
a network interface configured to provide or obtain network communications; and
one or more processors coupled to the network interface, wherein the one or more processors are configured to:
for a mobile wireless network, obtain an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate;
based on the first priority level being associated with a higher priority than the second priority level, determine whether the first potential guaranteed bit rate can be supported; and
if it is determined that the first potential guaranteed bit rate can be supported, provide an indication of the first unique identifier to a core network associated with the mobile wireless network, wherein the indication of the first unique identifier prompts the core network to enforce the first potential guaranteed bit rate.

9. The apparatus of claim 8, wherein the one or more processors are further configured to:
if it is determined that the first potential guaranteed bit rate can be supported:
after providing the indication of the first unique identifier, determine that the first potential guaranteed bit rate cannot be supported; and
in response to determining that the first potential guaranteed bit rate cannot be supported, provide an indication of the second unique identifier to the core network, wherein the indication of the second unique identifier prompts the core network to enforce the second potential guaranteed bit rate and further prompts generation of a usage report indicating that the core network is enforcing the second potential guaranteed bit rate.

10. The apparatus of claim 8, wherein the one or more processors are configured to:
provide the indication of the first unique identifier in a network packet header of a data packet provided to the core network.

11. The apparatus of claim 8, wherein the one or more processors are configured to:
obtain a policy and charging control rule that indicates the first potential guaranteed bit rate, the first unique identifier, the first priority level, the second potential guaranteed bit rate, the second unique identifier, and the second priority level.

12. The apparatus of claim 8, wherein the first unique identifier is a first unique eight-bit identifier and the second unique identifier is a second unique eight-bit identifier.

13. The apparatus of claim 8, wherein the apparatus is a fifth generation base station entity, and wherein the one or more processors are configured to:
provide the indication of the first unique identifier to a fifth generation core network.

14. A method comprising:
for a mobile wireless network, obtaining an indication of a first potential guaranteed bit rate, a first unique identifier associated with the first potential guaranteed bit rate, a first priority level associated with the first potential guaranteed bit rate, a second potential guaranteed bit rate, a second unique identifier associated with the second potential guaranteed bit rate, and a second priority level associated with the second potential guaranteed bit rate;
obtaining an indication of the first unique identifier in response to a determination that the first potential guaranteed bit rate can be supported based on the first priority level being associated with a higher priority than the second priority level; and
in response to obtaining the indication of the first unique identifier, enforcing the first potential guaranteed bit rate.

15. The method of claim 14, further comprising:
after enforcing the first potential guaranteed bit rate, obtaining an indication of the second unique identifier; and
in response to obtaining the indication of the second unique identifier, enforcing the second potential guaranteed bit rate.

16. The method of claim 15, further comprising:
in response to obtaining the indication of the second unique identifier, generating a usage report indicating that the second potential guaranteed bit rate is being enforced.

17. The method of claim 14, wherein obtaining the indication of the first unique identifier includes obtaining the indication of the first unique identifier in a network packet header of a data packet.

18. The method of claim 14, wherein obtaining the indication of the first potential guaranteed bit rate, the first unique identifier, the first priority level, the second potential guaranteed bit rate, the second unique identifier, and the second priority level includes obtaining a packet detection rule that indicates the first potential guaranteed bit rate, the first unique identifier, the first priority level, the second potential guaranteed bit rate, the second unique identifier, and the second priority level.

19. The method of claim 14, wherein the first unique identifier is a first unique eight-bit identifier and the second unique identifier is a second unique eight-bit identifier.

20. The method of claim 14, wherein the method is performed by a fifth generation user plane function entity.

* * * * *